April 17, 1934.  J. M. FREDERICK  1,955,231
PORTABLE SHOWER SPRAY
Filed Aug. 18, 1932
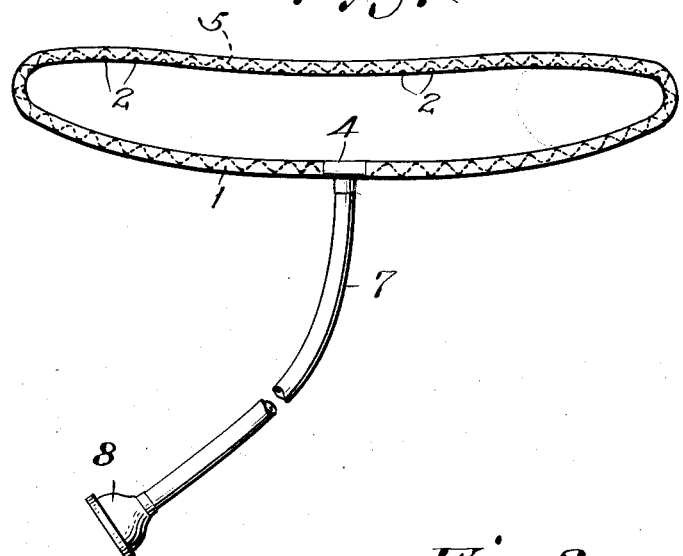
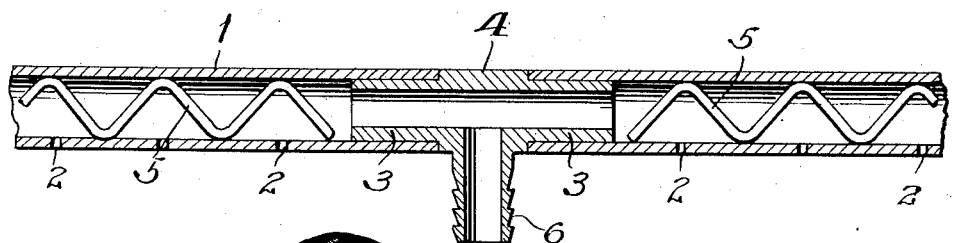
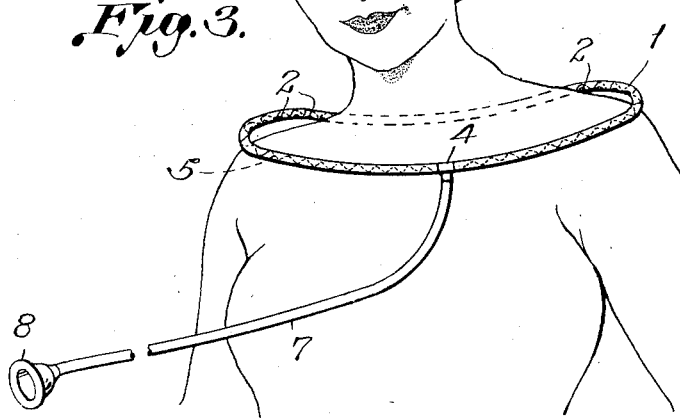
Inventor
Joseph M. Frederick Patented Apr. 17, 1934

1,955,231

UNITED STATES PATENT OFFICE 1,955,231

PORTABLE SHOWER SPRAY

Joseph M. Frederick, Baltimore, Md., assignor of one-half to Jacob L. Rosenfield, Baltimore, Md.

Application August 18, 1932, Serial No. 629,261

1 Claim. (Cl. 4—157)

This invention relates to improvements in portable shower sprays and has for its object to provide a simple and efficient device whereby the body of the person using my invention can be sprayed without wetting the head.

The invention consists of the new and novel construction and arrangement of the parts and combination of parts hereinafter more fully set forth in the following specification and pointed out in detail in the appended claim.

In the accompanying drawing;—

Figure 1 is an elevation of my invention showing the connecting hose partly broken away.

Figure 2 is an enlarged detail section showing the connection for the ends of the rubber ring and nozzle projecting therefrom, and also showing the stay-wire on the inside of the rubber ring to hold it in proper shape.

Figure 3 is a view showing my invention in position on the body being sprayed.

Referring to the accompanying drawing forming part of this specification, and in which like reference numerals designate like parts throughout the several views thereof, 1 designates the rubber spray which is provided with a number of apertures 2 and having its ends projecting over the ends 3 of the metal connecting piece 4. Within this spray 1 is a corrugated wire 5 so shaped to hold the spray 1 in proper shape to rest on the shoulders and also to prevent the spray from collapsing. The wire 5 being corrugated also prevents the apertures 2 from being closed by said wire. The metal connection 4 is provided with a nozzle 6 to which is secured the rubber hose 7 on the end of which latter is a socket 8 of any suitable design to fit over the spicket or faucet through which the water supply passes.

The spray 1 is so shaped that when turned sidewise it can be brought down over the head and then turned to rest upon the shoulders, as shown in Figure 3 of the drawing. The water flows through the pipe 7 from the faucet or other connection into the spray 1 and passes out through the apertures 2.

Having thus described my invention what I claim is:—

A portable shower spray comprising a rubber ring having a number of apertures therein, a three way connection to which the ends of said rubber ring are connected, a corrugated wire within said rubber ring to hold it in shape and to prevent the collapsing thereof, and also to prevent closing of said apertures, a rubber hose having one end connected to said three way connections and means on its opposite end adapted to fit a faucet or other means of water supply.

JOSEPH M. FREDERICK.